United States Patent

Matsumoto et al.

Patent Number: 5,397,284
Date of Patent: Mar. 14, 1995

[54] SHIFT CONTROL METHOD AND SYSTEM FOR AUTOMATIC TRANSMISSION

[75] Inventors: Akio Matsumoto; Junichi Doi, both of Hiroshima; Tomoo Sawazaki, Higashihiroshima, all of Japan

[73] Assignee: Mazda Motor Corporation, Hiroshima, Japan

[21] Appl. No.: 114,049

[22] Filed: Aug. 31, 1993

[30] Foreign Application Priority Data

Aug. 31, 1992 [JP] Japan .................................. 4-257420

[51] Int. Cl.⁶ ............................................ F16H 61/06
[52] U.S. Cl. ................................... 477/150; 475/129
[58] Field of Search .................. 475/129; 477/150, 151

[56] References Cited

U.S. PATENT DOCUMENTS

| | | | |
|---|---|---|---|
| 3,951,011 | 4/1976 | Lemon | 475/129 |
| 4,311,068 | 1/1982 | Chatterjea | 475/129 |
| 5,182,970 | 2/1993 | Goto et al. | 477/151 |
| 5,293,789 | 3/1994 | Goto et al. | 477/151 |

FOREIGN PATENT DOCUMENTS 2-76968  3/1990  Japan .

*Primary Examiner*—Dirk Wright
*Attorney, Agent, or Firm*—Keck, Mahin & Cate

[57] ABSTRACT

An automobile automatic transmission shift control system, for causing a specific gear shift by unlocking a first frictional element with a simultaneously with locking a second frictional element, discharges locking pressure from the first frictional element in such a way that the locking pressure is throttled after it has dropped below a specified level of pressure.

13 Claims, 9 Drawing Sheets

SHIFT CONTROL METHOD AND SYSTEM FOR AUTOMATIC TRANSMISSION

BACKGROUND OF THE INVENTION

1. Field of the Invention

The present invention relates to a gear shift control system of an automatic transmission installed in an automobile, and, more particularly, to an automatic transmission gear shift control system in which at the same time that a first frictional element among a plurality of frictional elements is coupled, a second frictional element is released or unlocked and to a method for same.

2. Description of Related Art

Typically, an automatic transmission installed in an automobile combines a torque converter and a transmission-gear mechanism, and is provided with a plurality of frictional elements, such as brakes and clutches, which switch the torque transmission paths of the transmission-gear mechanism, as well as a hydraulic circuit which controls the application of hydraulic pressure for engagement to these frictional elements and the discharge of hydraulic pressure from them. Such an automatic transmission is designed to shift automatically gears according to driving conditions by conducting selective application of hydraulic pressure for engagement to the plurality of frictional elements which is performed by pre-designed operation of actuators in the hydraulic circuit. In this hydraulic circuit there are provided various valves, such as a regulator valve which regulates a pressure discharged from an oil pump to a specified line pressure, a manual shift valve which is manually operated to shift gear ranges, and a plurality of shift valves which are automatically operated according to vehicle driving conditions so as to cause the actuators to selectively lock and unlock the frictional elements.

With regard to this type of automatic transmission, some frictional elements are simultaneously locked and/or unlocked during a specific gear shift. For example, with an automatic transmission of this type which can be selectively shifted to first (1st) to fourth (4th) gears and is provided an frictional element which is locked for third (3rd) and fourth (4th) gears and a frictional element which is locked for second (2nd) and fourth (4th) gears, at the time that the former frictional element is locked, the later frictional element is unlocked during, for example, an up-shifting of second (2nd)-to-third (3rd) gear.

In such an automatic transmission where a plurality of frictional elements are selectively locked and unlocked at the same time in order to execute shifting of gear, a timely management of locking and unlocking of the frictional elements is quite important in order to complete smoothly shifting of gear. During the up-shifting of second (2nd)-to-third (3rd) gear, if the execution of unlocking of the frictional element for second (2nd) and fourth (4th) gears is made comparatively earlier than the execution of locking of the frictional element for third (3rd) and fourth (4th) gears, the transmission mechanism transitionally shifts through a neutral range, resulting in an occurrence of a racing of engine. In contrast, in the event where the execution of unlocking of the frictional element for second (2nd) and fourth (4th) gears is made comparatively later than the execution of locking of the frictional element for third (3rd) and fourth (4th) gears, the transmission mechanism is temporarily brought into what is called a "double-locked" state, so as to cause a shift shock due to a drop of output torque.

In order to eliminate such drawbacks of the automatic transmission of this type, the timing of locking and unlocking of the frictional elements must be properly regulated.

Essentially, the regulation of a timing at which locking and unlocking of the frictional elements are made is performed by means of passing hydraulic pressure through orifices which are formed in pressure lines leading to actuators of the respective frictional elements. Furthermore, for more precisely regulating the timing, each pressure line is accompanied by a bypass pressure line which is opened and closed by a timing valve so as to allow and prohibit the hydraulic pressure to bypass the orifice. This timing valve is operated during a shifting of gear so as to conduct the timing of supply and discharge of hydraulic pressure through the bypass line quickly for a first half of gear shift operation and through the orifice generously for a second half of gear shift operation, thereby precisely controlling the timing. Such an automatic transmission control means is known from, for instance, Japanese Unexamined Patent Publication No. 2-76968.

However, even in the event where a timing valve is installed to control the timing of supply and discharge of hydraulic pressure, the automatic transmission is subjected to a racing of engine and a shift shock. That is, with the configuration in which a hydraulic circuit is provided, in a pressure discharge line leading to the frictional element for second (2nd) and fourth (4th) gears which are unlocked during 2–3 shift-up, with an orifice which stops down the pressure discharge line, a bypass pressure line bypassing the orifice, and a timing valve installed in the bypass pressure line which opens the bypass pressure line for a predetermined period for a first half of gear shift operation, even though the period for which the timing valve opens the pressure bypass line is established to be unchanged, the level of pressure is not always stable while the pressure bypass line is closed. This is because, as the viscosity of working oil changes according to its temperature, the working oil in the automatic transmission is subjected to deterioration of fluidity. Accordingly, if the temperature of working oil is lowered in excess, unlocking of the frictional element for the second (2nd) and fourth (4th) gears is advanced in excess ahead locking of the frictional element for the third (3rd) and Fourth (4th) gears, resulting in a racing of engine. On the other hand, if the temperature of working oil rises in excess, unlocking of the frictional element for the second (2nd) and fourth (4th) gears is delayed in excess, resulting in a shift shock due to double-lock.

SUMMARY OF THE INVENTION

It is an object of the present invention to provide a gear shift control method and system for an automobile automatic transmission in which a specific gear shifting is properly performed by simultaneous unlocking of a first frictional element with locking of a second frictional element and, in particular, unlocking of the first frictional element is appropriately actuated.

The above object of the present invention is achieved by providing a gear shift control method and system for an automatic transmission, having a plurality of hydraulically operated frictional elements, for an automotive vehicle in which the hydraulically operated frictional elements are selectively locked and unlocked to automatically perform gear shifts according to vehicle driving conditions. In particular, for a specific gear shift, a first specific hydraulically operated frictional element is unlocked simultaneously with locking a second specific hydraulically operated frictional element. The shift control system includes a hydraulic control circuit, for supplying and releasing pressurized hydraulic oil with which the hydraulically operated frictional elements are locked and unlocked, which is provided with a pressure control means, which is self-responsive to pressure, for allowing the locking oil pressure to be discharged from the first specific hydraulically operated frictional element without being throttled until the locking oil pressure drops to a specified level of pressure and throttling the locking oil pressure discharged from the first specific hydraulically operated frictional element after the locking pressure has dropped below the specified level of pressure.

The hydraulic control circuit further includes a bypass passage means through which the locking oil pressure is discharged bypassing the pressure control means. The bypass passage means is maintained closed for a first half period of the specific gear shift and is opened in a second half period of the specific gear shift, for instance, after a specified time from a commencement of the specific gear shift. Further, the shift control system actuates the switching means to open the bypass passage means when a changing rate of said rotational speed has become minus.

With the configuration of a shift control system in accordance with a preferred embodiment of the present invention, immediately after the commencement of unlocking of the first frictional element, the shift control system causes a rapid discharge of locking pressure from the first frictional element and, when the locking pressure is lowered to the specified level, it throttles the locking pressure so that the locking pressure is discharged gently from the first frictional element. This gentle discharge prevents unlocking of the first frictional element from advancing in excess with respect to locking of the second frictional element, so as to ensure overlapping between unlocking of the first frictional element and locking of the second frictional element, thereby eliminating an neutral state of the automatic transmission accompanying a rasing of engine.

Furthermore, because the discharge of locking pressure is made through a bypass passage means bypassing the pressure control means during an inertia phase in the second half period of the specified gear shift, an occurrence of unduly prolonged double-locking, in which both first and second frictional elements are under locked condition, is eliminated. Causing the locking pressure to bypass the pressure control means after a specified time from a commencement of the specific gear shift makes it certain to eliminate an occurrence of double locking. In addition, causing locking pressure to bypass the pressure control means when a changing rate of the input speed of the automatic transmission has become minus eliminates an occurrence of double locking without a lack of output torque.

BRIEF DESCRIPTION OF THE DRAWINGS

The above and other objects and features of the present invention will be clearly understood from the following description of a preferred embodiment thereof when considered in conjunction with the accompanying drawings, in which.

DETAILED DESCRIPTION OF PREFERRED EMBODIMENTS

Figure 1:
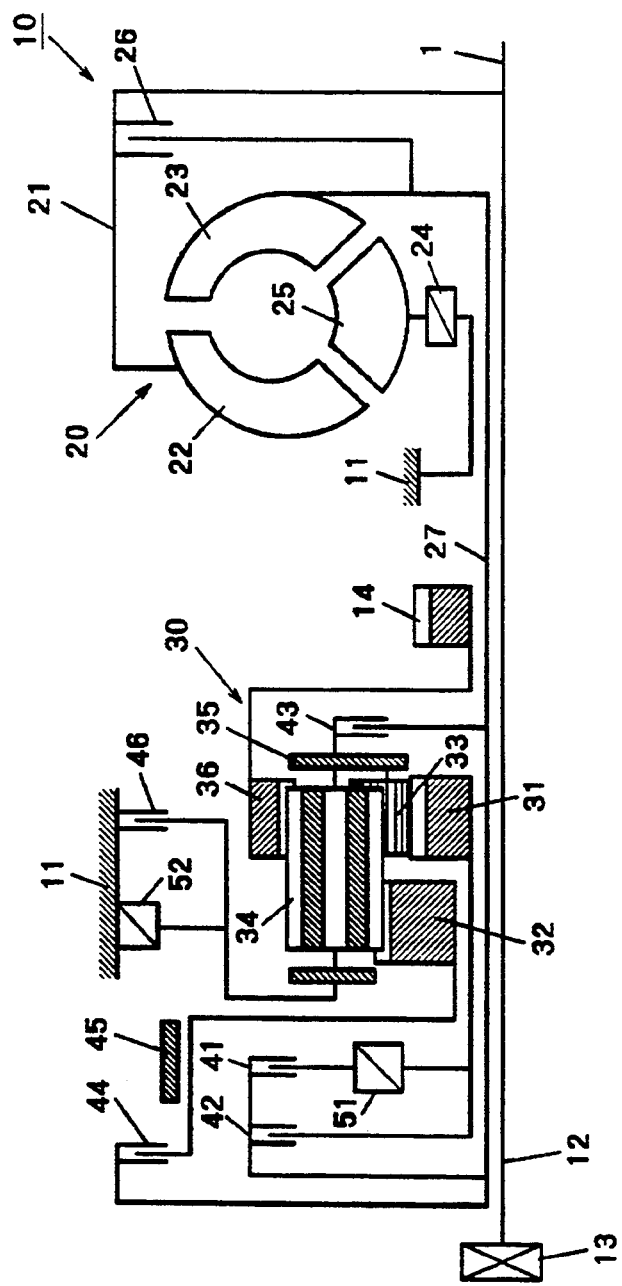
FIG. 1 is a schematic illustration of an automatic transmission with which a shift control system in accordance with a preferred embodiment of the present invention cooperates.

Referring to the drawings in detail, and, in particular, to FIG. 1, an automatic transmission 10, which is controlled by a shift control system in accordance with a preferred embodiment of the present invention, includes as its main components a torque converter 20, a transmission gear mechanism 30 which is driven by the output from the torque converter 20, a plurality of frictional elements 41 to 46, such as brakes and clutches, which are selectively locked and unlocked to switch torque transmission paths of the transmission gear mechanism 30, and one-way clutches 51 and 52.

The torque converter 20 is composed of a pump 22 fixed inside a case 21 which is fixedly connected to an engine output 1 only schematically shown, such as a crankshaft, a turbine 23, driven with hydraulic oil by the pump 22 and arranged opposite the pump 22, a stator 25, disposed between the pump 22 and turbine 23, which is supported by the transmission case 11 through the one-way clutch 24 and conducts multiplication of torque, and a lock-up clutch 26, arranged between the case 21 and turbine 23 and directly connecting the engine output shaft 1 to the turbine 23 via the case 21. The rotation of turbine 23 is transmitted to the transmission gear mechanism 30 via a hollow turbine shaft 27. In this instance, a pump shaft 12, passing through the interior of hollow turbine shaft 27, connects to the engine output shaft 1. An oil pump 13, installed in the rear end part of the automatic transmission 10, is driven by the pump shaft 12.

On the other hand, the transmission gear mechanism 30 is composed of a Labinio type planetary gear set having a small sun gear 31 which is fitted onto the turbine shaft 27, a large sun gear 32, having a diameter large than small sun gear 31, which is similarly fitted onto the turbine shaft 27 behind the small sun gear 31, a plurality of short pinion gears 33 in mesh with the small sun gear 31, a long pinion gear 34 with its front half in mesh with the short pinion gear 33 and its rear half in mesh with the large sun gear 32, a carrier 35, by which the short and long pinion gears 33 and 34 are supported for rotation, and a ring gear 36 in mesh with the long pinion gear 34.

A forward clutch (FW CL) 41 and a first one-way clutch (1st OW CL) 51 are interposed in parallel with respect to and between the turbine shaft 27 and small sun gear 31. A coast clutch (CS CL) 42 is arranged in parallel to these one-way clutches 41 and 51, and a 3-4 clutch (3-4 CL) 43 is interposed between the turbine shaft 27 and carrier 35. Further, a reverse clutch (RV CL) 44 is interposed between the turbine shaft 27 and large sun gear 32, and a 2-4 brake (2-4 BR) 45, consisting of a band brake, is provided between the large sun gear 32 and reverse clutch 44 so as to fixe in place the large sun gear 32 when activated or locked. Between the carrier 35 and transmission case 11 there are provided a second one-way clutch (2nd OW CL) 52, which is designed and adapted to catch a reaction force from the carrier 35, and a low reverse brake (LR BR) 46, which fixes in place the carrier 35, in parallel to each other. The ring gear 36 is connected to an output gear 14 so as to transmit driving torque to left and right drive wheels (not shown) via a differential (not shown).

In this instance, the automatic transmission 10 enables selections of the ranges of park (P), reverse (R), neutral (N), drive (D), second (S) and low (L) by manipulation of a shift lever (not shown), and automatic selections, in the forward ranges of drive (D), second (S) and low (L), of among 1st and 4th gears, among 1st and 3rd gears, and among 1st and 2nd gears, respectively. Table I shows the selectively locked and unlocked states of the frictional elements 41 to 46, which are clutches and brakes, and the first and second one-way clutches 51 and 52 for each range and each gear.

TABLE I

| Range & Gear | FW CL (41) | CS CL (42) | 3-4 CL (43) | RV CL (44) | 2-4 BR (45) | LR BR (46) | OW-CL 1ST | OW-CL 2ND |
|---|---|---|---|---|---|---|---|---|
| P |   |   |   |   |   |   |   |   |
| R |   |   |   | o |   | o |   |   |
| N |   |   |   |   |   |   |   |   |
| D |   |   |   |   |   |   |   |   |
| 1ST | o |   |   |   |   |   | o | o |
| 2ND | o |   |   |   | o |   |   | o |
| 3RD | o | o | o |   |   |   |   | o |
| 4TH | o |   | o |   | o |   |   |   |
| S |   |   |   |   |   |   |   |   |
| 1ST | o |   |   |   |   |   | o | o |
| 2ND | o | o |   |   | o |   |   | o |
| 3RD | o | o | o |   |   |   |   | o |
| 4TH | o |   | o |   | o |   |   |   |
| L |   |   |   |   |   |   |   |   |
| 1ST | o | o |   |   |   | o | o | o |
| 2ND | o | o |   |   | o |   | o |   |

Figure 2:
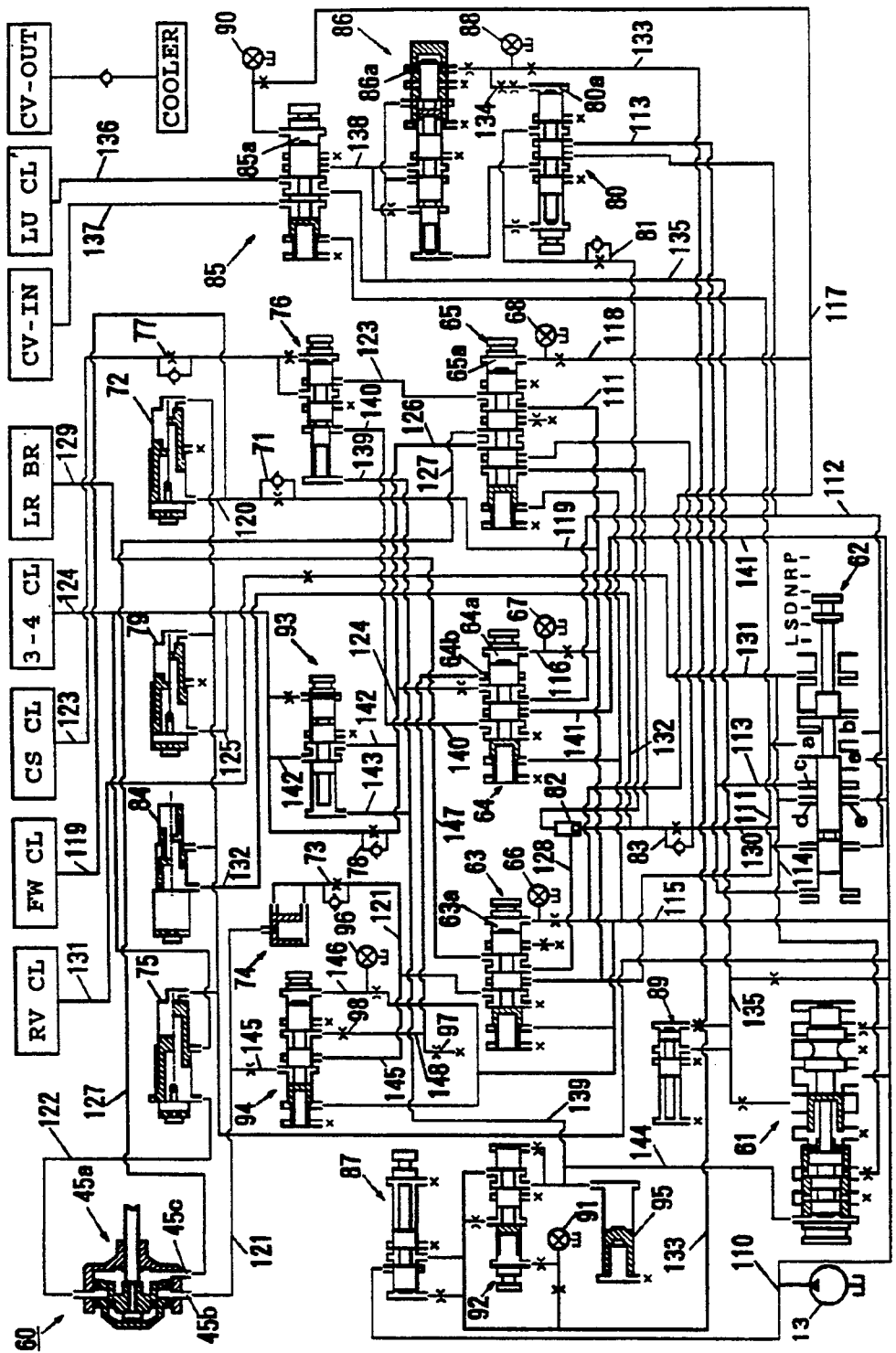
FIG. 2 is a diagram of a hydraulic circuit of the shift control system.

Referring to FIG. 2, a hydraulic circuit 60 for supplying hydraulic oil to and releasing hydraulic oil to hydraulic actuators 41a to 46a which respectively operate the frictional elements 41 to 46 is shown. Among the hydraulic actuators 41a to 46a, the hydraulic actuator 45a assigned to the 2-4 brake 45 is composed of a servo piston having an apply port 45b and a discharge port 45c. The 2-4 brake 45 it is engaged or locked when it is supplied with hydraulic oil only at the apply port 45b, However, the 2-4 brake 45 is released or unlocked when it is not supplied with hydraulic oil at the apply port 45b nor at the discharge port 45c, when it is supplied with hydraulic oil at both apply port 45b and discharge port 45c, and when it is supplied with hydraulic oil only at the discharge port 45c. The other actuators 41a to 44a and 46a are composed of ordinary hydraulic pistons and, when hydraulic oil is supplied thereto, the respectively related frictional elements 41 to 44 and 51 and 52 are engaged or locked.

This hydraulic circuit 60 is provided with a regulator valve 61 for adjusting the hydraulic pressure which is discharged from the oil pump 13 to a main pressure line 100 to a specified line pressure, a manual valve 62 which is manually actuated through a shift lever (not shown) to select ranges, and shift valves, such as first to second (1-2), second to third (2-3) and third to fourth (3-4) shift valves 63, 64 and 65, which are caused according to the selected gears so as to selectively supply the line pressure to the hydraulic actuators 41a to 46a. This manual valve 62, which selectively feeds the line pressure to each hydraulic pressure line cooperating with the selected range, has an input port e through which the line pressure is introduced from the main pressure line 110 and first to fourth output ports a to d. As a result of the slide movement of a spool 62s accompanying the manipulation of the shift lever by the driver, the input port e communicates with the first and second output ports a and b in the drive (D) and second (S) ranges, with the first and third output ports a and c in the low (L) range, and with the fourth output port d in the reverse (R) range. First to fourth output pressure lines 111 to 114 are respectively connected to these output ports a to d. The first-to-second (1-2), second-to-third (2-3) and third-to-fourth (3-4) shift valves 63, 64 and 65 are designed to urge their spools 63s, 64s and 65s toward the right position, as viewed in FIG. 2, respectively, with use of springs (not shown). On the right side of these spools 63s, 64s and 65s, there are provided pilot ports 63a, 64a and 65a, respectively. A first pilot pressure line 115, branching off from the main pressure line 110, is connected to the pilot port 63a of the first to second (1-2) shift valve 63. A second pilot pressure line 116, branching off from the first output pressure line 111 is connected to the pilot port 64a of the second to third (2-3) shift valve 64, and a third pilot pressure line 118, leading from the first output pressure line 111 through a pressure line 117, is connected to the pilot port 65a of the third to fourth (3-4) shift valve 65. First, second and third solenoid valves 66, 67 and 68, which are used in shifting gears, are respectively installed in these pilot pressure lines 115, 116 and 118. When these solenoid valves 66 to 68 are de-energized or turned OFF, pilot pressure is introduced into the pilot ports 63a to 65a of the related shift valves 63 to 65, respectively, from the pilot pressure lines 115, 116 and 118, so that the spools 63s to 65s are positioned in their left end positions from the standpoints shown in FIG. 2. While, when they are energized or turned ON, pilot pressure is drained from the pilot ports 63a to 65a, and then, the spools 63s to 65s are positioned in their right end positions.

Figure 3:
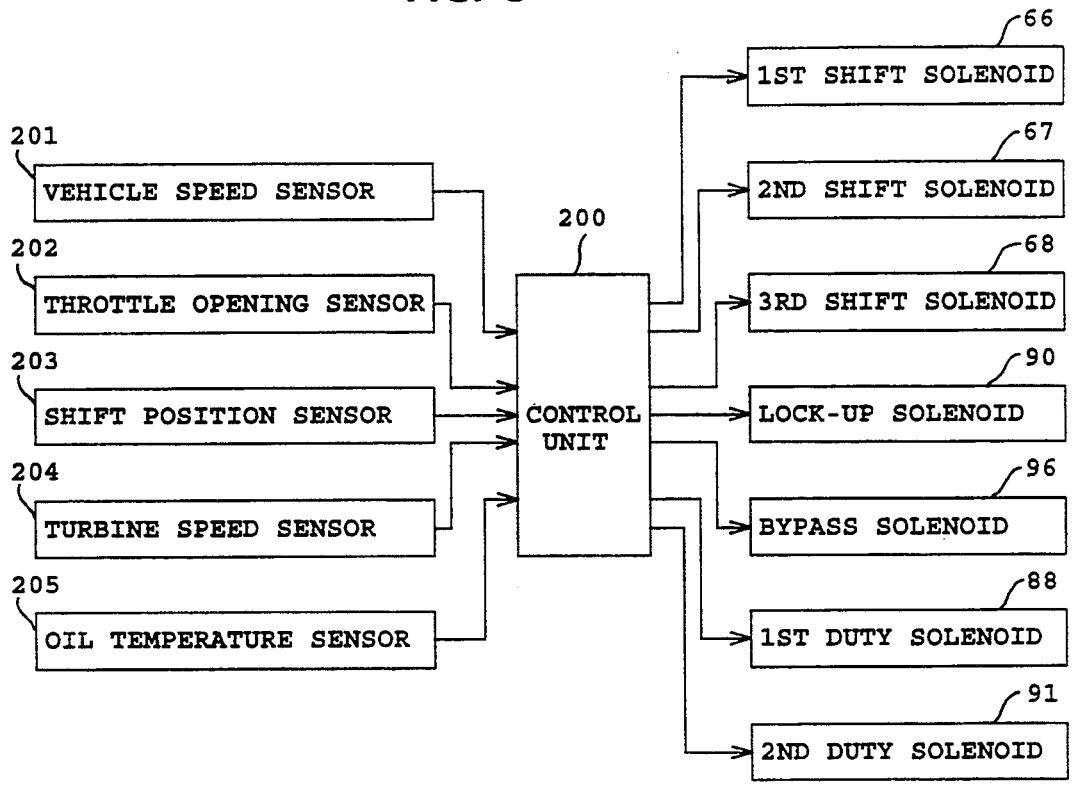
FIG. 3 is a block diagram of a control system.

These solenoid valves 66 to 68 are turned ON or OFF corresponding to a selected gear, to which the automatic transmission 10 is set, by a signal from a control unit 200, as shown in FIG. 3. To this control unit 200 are inputted various signals, such as a vehicle speed signal from a vehicle speed sensor 201 representative of the speed of vehicle, a throttle opening signal from a throttle opening sensor 202 representative of the opening of an engine throttle, a shift range signal from a shift position sensor 203 representative of the range selected by the shift lever, a turbine speed signal from a turbine speed sensor 204 representative of the speed of turbine of the automatic transmission 10, and a oil temperature signal from a water temperature sensor 205 representative of the temperature of working oil in the automatic transmission 10. Based on a gear shift map pre-designed according to driving conditions, such as vehicle speed and throttle opening, in the respective forward ranges, ON/OFF signals are outputted to the respective solenoid valves (SLVs) 66 to 68 so as to attain an appropriate gear. As a result, the respective shift valves 63–65 shift their spools 63s–65s so as to selectively bring the frictional elements 41–46 into communication with appropriate pressure lines.

In this case, ON/OFF patterns of the solenoid valves 66 to 68 are selected according to the ranges and gears as shown in Table II.

TABLE II

| RANGE | D RANGE | | | | S RANGE | | | | L RANGE | |
|---|---|---|---|---|---|---|---|---|---|---|
| GEAR | 1ST | 2ND | 3RD | 4TH | 1ST | 2ND | 3RD | 4TH | 1ST | 2ND |
| 1ST SLV (66) | OFF | ON | ON | ON | OFF | ON | ON | ON | OFF | ON |
| 2ND SLV (67) | ON | ON | OFF | OFF | ON | ON | OFF | OFF | ON | ON |
| 3RD SLV (68) | ON | ON | OFF | ON | ON | ON | OFF | ON | ON | OFF |

As will be discussed in detail later, since the control unit 200 operates various other valves, such as a solenoid valve 90 for locking-up of torque converter 20, a solenoid valve 96 for controlling a bypass passage, and first and second duty solenoid valves 88 and 91.

Among the first to fourth output pressure lines 111 to 114 connected to the respective output ports a to d of the manual valve 62, the first pressure output line 111, which is in communication with the main pressure line 100 in each of the forward ranges, i.e. the drive range (D), the second range (S) and the low range (L), is led to the actuator 41a of the forward clutch 41 through a forward-clutch pressure line 119 via an one-way orifice 71. Consequently, in each of the drive range (D), the second range (S) and the low range (L), the forward clutch 41 is always engaged or locked. In this hydraulic circuit 60, an accumulator 72 used as a buffer during forward clutch engagement or locking is provided in a pressure line 120 branching off from the forward-clutch pressure line 119.

First output pressure line 111 is led to the 1–2 shift valve 63. When the first solenoid valve 66 is energized or turned ON and a spool of the 1–2 shift valve 63 has moved to the right end position, the output pressure line 111 is brought into communication with a servo-apply pressure line 121, and leads to the apply port 45b of servo-piston 45a via a one-way orifice 73 and a pressure discharge control valve 74. Consequently, when the first solenoid valve 66 is energized or turned ON in each of the drive range (D), the second range (S) and the low range (L), that is, at the 2nd gear, at the 3rd gear and at the 4th gear in the drive range (D) and second range (S), and at the 2nd gear in the low range (L), servo-apply pressure is introduced into the servo piston 45a at the apply port 45b. Under this condition, when the servo-piston 45a is not applied with servo-release pressure at the discharge port 45c, the 2–4 brake 45 is locked. In this instance, the one-way orifice 73 is designed and adapted to throttle appropriately hydraulic oil in the direction of releasing of servo-apply pressure. Further, the servo-piston 45a is connected at the apply port 45b to an accumulator 75, used as a buffer during 2–4 brake engagement or locking, through a pressure line 122.

Figure 4:
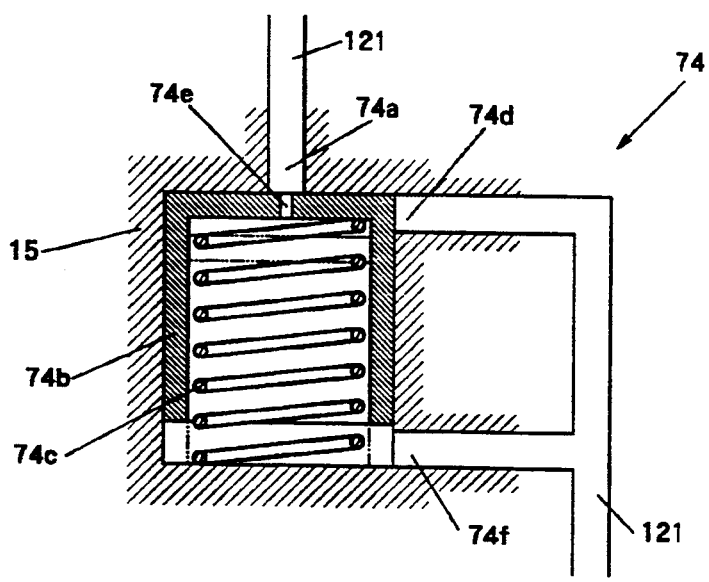
FIG. 4 is an enlarged cross-sectional view of a pressure discharge control valve used in the hydraulic circuit of the shift control system.

Referring to FIG. 4, the pressure discharge control valve 74 has a hollow cylindrical housing 15 in which a hollow cylindrical valve body 74b having a closed bottom end is fitted upside down so as to slide up and down. This valve body 74b is urged upward by means of a coil spring 74c. The interior of housing 15 is in communication with an downstream port 74a of servo-apply pressure line 121, an upstream port 74f and a relief port 74d. This downstream port 74a of servo-apply pressure line 121 is kept communicated with the interior of the hollow valve body 74b by means of a relatively large orifice 74e formed in the bottom end of valve body 74b. On the other hand, these upstream and relief ports 74d and 74f of servo-apply pressure line 121 are selectively brought into communication with the interior of valve body 74b. That is, while the valve body 74b is kept forced upward by means of coil spring 74c, the downstream port and upstream port 74f of servo-apply pressure line 121 is in communication with each other through the interior of the valve body 74b via the orifice 74e. However, if the valve body 75b is forced downward against the coil spring 74c, the downstream port 74a and relief port 74d of servo-apply pressure line 121 are brought into direct communication with each other.

At the beginning of releasing of servo-supply pressure, the valve body 74b is forced down against the coil spring 74c, the downstream port 74a and relief port 74d of servo-apply pressure line 121 are brought into direct communication, so that the pressure discharge control valve 74 causes hydraulic pressure in the apply port 45b of servo piston 45a to be discharged quickly. When the servo apply pressure drops down to a predetermined level of pressure which depends upon the reaction force of coil spring, the valve body 74b is forced upward, so as to disconnect the downstream port 74a of servo-apply pressure line 121 from the discharge port 74d of servo-apply pressure line 121 and connect it to the upstream port 74f of servo-apply pressure line 121. Then, by means of the throttling action of orifice 74e, the pressure discharge control valve 74 allows hydraulic pressure in the apply port 45b of servo piston 45a to be discharged gently into the upstream port 74f of servo-apply pressure line 121.

Referring again to FIG. 2, the first pressure output line 111 is further led to the 3–4 shift valve 65. When the third solenoid valve 68 is de-energized or turned OFF and its spool is shifted to the left end position, the first pressure output line 111 is brought into communication with a coast clutch pressure line 123. This coast clutch pressure line 123 is lead to the coast clutch actuator 42a of coast clutch 42 via a coast reducing valve 76 and a one-way orifice 77. Consequently, the coast clutch 42 is locked at 3rd gear in the drive (D) and second (S) ranges, and at 2nd gear in the low (L) range, when the third solenoid valve 68 has been turned OFF.

The second pressure output line 112, brought into communication with the main pressure line 110, is led to the 2-3 shift valve 64. When the second solenoid valve 67 is de-energized or turned OFF and its spool is shifted to the left end position, the second pressure output line 112 is brought into communication with a 3-4 clutch pressure line 124. This 3-4 clutch pressure line 124 is further led to the 3-4 clutch actuator 43a of 3-4 clutch 43 via a one-way orifice 78. Consequently, the 3-4 clutch 43 is locked at 3rd and 4th gears in the drive (D) and second (S) ranges, when the second solenoid valve 67 has been turned OFF.

A pressure line 126, branching off from the 3-4 clutch pressure line 124, is led to the 3-4 shift valve 65. When the third solenoid valve 68 is de-energized or turned OFF and its spool is shifted to the left end position, the pressure line 126 is brought into communication with a servo-release pressure line 127 in communication with the servo-discharge port 45c of servo-piston 45a. Consequently, release pressure is introduced into the discharge port 45c of servo-piston 45a at 3rd gear in the drive (D) and second (S) ranges, when the second and third solenoid valve 67 and 68 have been turned OFF.

The third output pressure line 113, in communication with the main pressure line 110 when the manual valve 62 is positioned to select the low range (L), is led to the 1-2 shift valve 63 through the low reducing valve 80, one-way orifice 81, ball-valve 82 and pressure line 128. When the first solenoid valve 66 is de-energized or turned OFF and the spool of the 1-2 shift valve 63 is shifted to the left end position, this pressure line 128 is brought into communication with a low-reverse brake pressure line 129 in communication with the low-reverse brake 46. Consequently, the low-reverse brake 46 is locked at 1st gear in the low range (L) when the first solenoid valve 66 has been turned OFF.

The fourth output pressure line 114, in communication with the main pressure line 110 when the manual valve 62 is positioned to select the reverse range (R), is led to the 1-2 shift valve 63 through a pressure line 130 branching off from the fourth output pressure line 114, a one-way orifice 83, the ball valve 82 and the pressure line 128. When the first solenoid valve 66 is de-energized or turned OFF and its spool is shifted to the left end position, the fourth pressure output line 130 is brought into communication with the low-reverse brake pressure line 129. Further, the fourth pressure output line 114 is led as a reverse-clutch pressure line 131 to the reverse-clutch 44. Consequently, in the low range (L) when the first solenoid valve 66 has been turned OFF, the low-reverse brake 46 is locked and, on the other hand, the reverse clutch 44 is kept locked. In addition, an accumulator 84, which in turn serves as a buffer during the engagement of reverse clutch, is provided in a pressure line 132 branching off from the fourth output pressure line 130 between the one-way orifice 83 and ball valve 82.

In addition to the above configuration, the hydraulic circuit 60 is provided with a lock-up shift valve 85 for actuating the lock-up clutch 26 in the torque converter 20 and a lock-up control valve 86 for controlling or regulating hydraulic pressure supplied to the torque converter 20 through the lock-up shift valve 85. The lock-up control valve 86 is communicated at its pilot port 86a with a pilot pressure line 133 led from the main pressure line 110 via a reducing solenoid valve 87. The low-reducing solenoid valve 80 is communicated at its pilot port 80a with a pressure line 134 branching off from the pilot pressure line 133.

A torque converter pressure line 135 leads from the regulator valve 61 to the lock-up shift valve 89 via the relief valve 89, and a pilot pressure line 117, leading to the main pressure line 110 through the first pilot pressure line 115 and having the lock-up solenoid valve 90, is connected to the pilot port 85a at one end of the lock-up shift valve 85. When the lock-up solenoid valve 90 is de-energized or turned OFF by a signal from the control unit 150 and as a result, the spool of the lock-up shift valve 85 is shifted to the left end position, the torque converter pressure line 135 is brought into communication with a lock-up release pressure line 136 led to the inside of torque converter 20, so as to completely unlock the torque converter 20. On the other hand, when the lock-up solenoid valve 90 is energized or turned ON and, as a result, the spool of the lock-up shift valve 85 is shifted to the right end position, the torque converter pressure line 135 is brought into communication with the converter pressure line 137 while the lock-up release pressure line 136 is brought into communication with the lock-up control valve 86 via a pressure line 138. By means of regulating pilot pressure introduced into the lock-up control valve 86 at its pilot port 86a from the pilot pressure line 133 with the use of first duty solenoid valve 88, the pressure difference between a locking pressure from the converter pressure line 137 and a release pressure from the lock-up release pressure line 136 is controlled so that the lock-up clutch 26 is completely locked or allowed to produce predetermined slippage.

As was previously described, since the low-reducing valve 80 in the third pressure output line 113 is connected at its pilot port 80a to the pressure line 134 branching off from the pilot pressure line 133, in the state where the lock-up shift valve 85 places its spool in the left end position, the low-reverse brake pressure introduced into the low-reverse brake 46 is controlled in the low range (L) with pilot pressure, introduced into the low-reducing valve 80 at the pilot port 80a, which is duty-controlled by the first duty solenoid valve 88.

The cost reducing valve 76, which is in communication with the coast clutch 42 through the coast clutch pressure line 123, is supplied at one end of its spool with coast clutch pressure in a manner of feedback control. On the other hand, throttle modulated pressure, which is generated by the second duty solenoid valve 91 according to engine load, is delivered by a pressure modulator valve 92 to another end of the spool of the coast reducing valve 76 through a pressure line 139. Throttle modulated pressure is delivered to the regulator valve 61 through a pressure line 144 in which an accumulator 95 is provided as a buffer. A pressure line 140, which is connected to the coast reducing valve 76 at its half way and led to the 2-3 shift valve, is brought into communication with a pressure line 141 leading to the main pressure line 110 when the second solenoid valve 67 is turned so as to place its spool in its right end position. With this configuration, the line pressure and throttle modulated pressure force the spool of the coast reducing valve 76 to be placed in the right end position as viewed in FIG. 2. Accordingly, at 2nd gear in the low range (L) where the second solenoid valve 67 is energized or turned ON, coast clutch pressure is magnified so as to increase torque assigned to the coast clutch 42. On the other hand, when the second solenoid valve 67 is de-energized or turned OFF, the 2-3 shift valve 64 places its spool in the left end position, so as to disconnect the communication of pressure lines 140 and 141.

Consequently, at 3rd gear in the drive (D) and second (S) ranges where the second solenoid valve 67 is de-energized or turned OFF, an increase in coast clutch pressure is suppressed, so as to decrease torque assigned to the coast clutch 42.

The hydraulic circuit 60 is further provided with a 2-3 bypass valve 93 and a timing valve 94 for regulating a timing at which hydraulic pressure is supplied to or discharged from the shift valves during a gear shift.

The 2-3 bypass valve 93 is provided in a bypass pressure line 142 bypassing the one-way orifice 78 in the 3-4 clutch pressure line 124. Introduced into the 2-3 bypass valve 93 at one end is 3-4 clutch pressure in the 3-4 clutch pressure line 124 downstream from the one-way orifice 78. Further, throttle modulated pressure generated by the pressure modulator valve 92 is introduced into the 2-3 bypass valve 93 at another end through a pressure line 143 branching off from the pressure line 139. When the 2-3 bypass valve 93 shifts its spool to the left end position as a result of an increase in 3-4 clutch pressure above a predetermined level of pressure, it disconnects the communication of bypass pressure line 142 from the pressure line 143. Consequently, 3-4 clutch pressure is supplied quickly to the 3-4 clutch through the bypass pressure line 142 at the beginning of pressure supply, and then, becomes supplied gradually by means of one-way orifice 78 with time. In this manner, the timing at which the 3-4 clutch 43 is locked is regulated during a 2-3 shift-up and is varied according to throttle openings.

Figure 5:
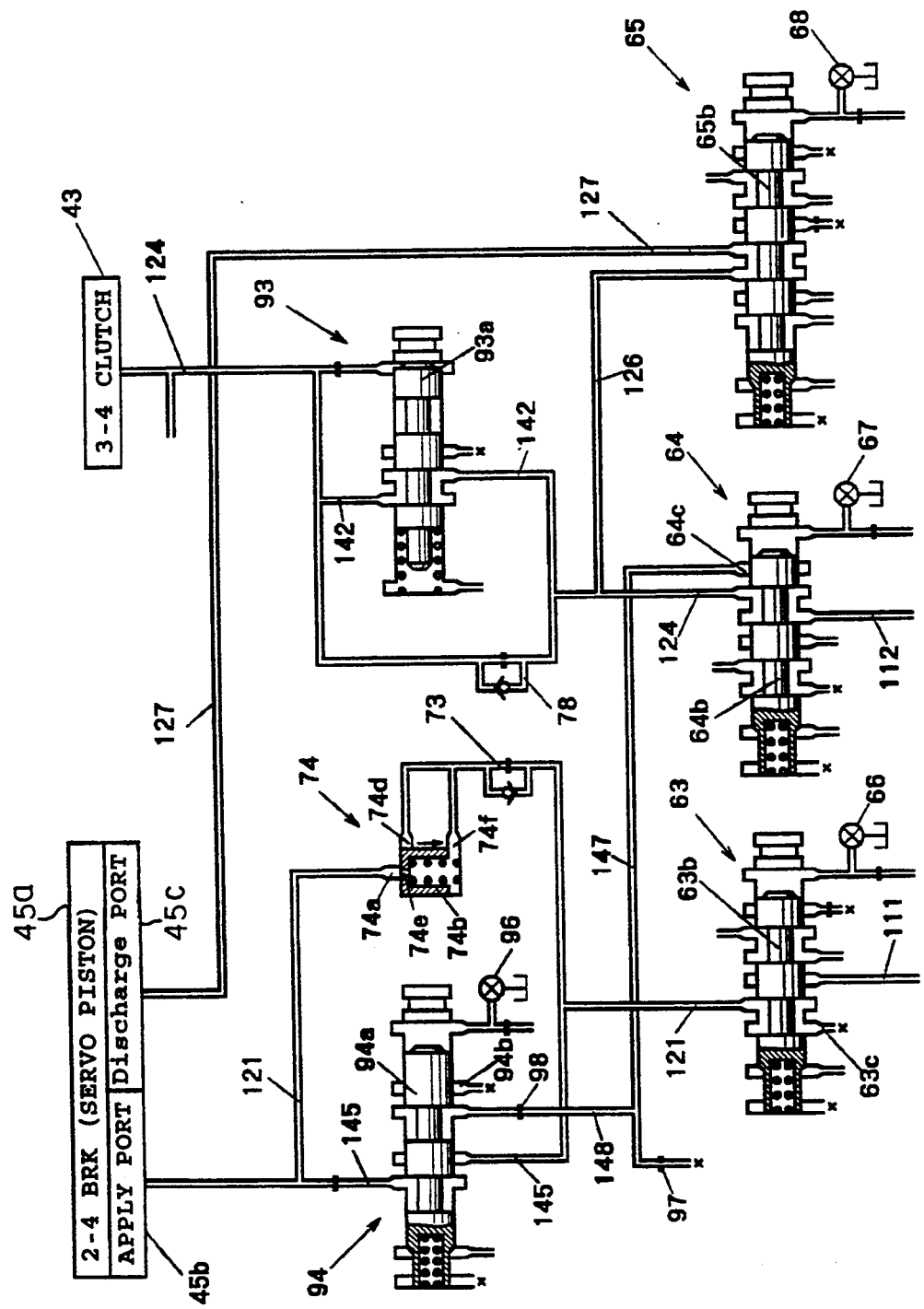
FIG. 5 is an enlarged diagram showing an essential part of the hydraulic circuit.

Referring to FIG. 5, the timing valve 94 is disposed in a bypass pressure line 145, branching off from the servo-apply pressure line 121, which bypasses the one-way orifice 73 and pressure discharge control valve 74. This timing valve 94 is communicated at its one end with a pilot, pressure line 146, branching off from the first pilot pressure line 115, which is provided with a bypass control solenoid valve 96.

The 2-3 shift valve 64 is provided with a drain port 64c which is brought into communication with the 3-4 clutch pressure line 124 when the 2-3 shift valve 64 shifts its spool 64b to its right end position (as viewed in FIG. 5). A first pressure drain line 147, connected to the drain port 64c, is provided with a first orifice 97. A second pressure drain line 148, branching off from the first pressure drain line 147 upstream from the first orifice 97, is led to the timing valve 94 via a second orifice 98. This second pressure drain line 148 is brought into communication with a drain port 94b of timing valve 94 when the timing valve 94 shifts its spool 94b to its right end position (as viewed in FIG. 5). In other words, when the second solenoid valve 67 is turned ON so as to cause the 3-4 shift valve 64 to place its spool 64 in its right end position, the 3-4 clutch pressure line 124, leading to the 3-4 clutch, is brought into communication with the first pressure drain line 147. Consequently, 3-4 clutch pressure is discharged gently by means of throttling action of first orifice 97 in the first pressure drain line 147. On the other hand, while the 3-4 clutch pressure line 124 is in communication with the first pressure drain line 147, when the bypass control solenoid valve 96 is turned ON so as to cause the timing valve 94 to place its spool 94a in the right end position, the first pressure drain 147 is brought into communication with the drain port 94c of timing valve 94 through the second pressure drain line 148. This result in quick discharging of 3-4 clutch pressure.

With the automatic transmission 10 configured above, during, for instance, up-shifting from second gear (2nd) to third gear (3rd) in the drive range (D), unlocking of 2-4 brake 45 is performed simultaneously with locking of 3-4 clutch. By means of the installation of pressure discharge control valve 74 and timing valve 94, the timing at which the 2-4 brake 45 is unlocked appropriately adjusted to the locking timing of 3-4 clutch 43 during a 2-3 shift-up. In this instance, during a 2-3 shift-up, the first to third solenoid valves 66 to 68 are switched in ON-OFF pattern from for the second gear (2nd) to for the third gear (3rd) via a transitional pattern, as shown in Table III.

TABLE III

|  | 2ND GEAR | TRANSITIONAL | 3RD GEAR |
| --- | --- | --- | --- |
| 1st SOLENOID VALVE (66) | ON | OFF | ON |
| 2ND SOLENOID VALVE (67) | ON | OFF | OFF |
| 3RD SOLENOID VALVE (68) | ON | ON | OFF |

Figure 6:
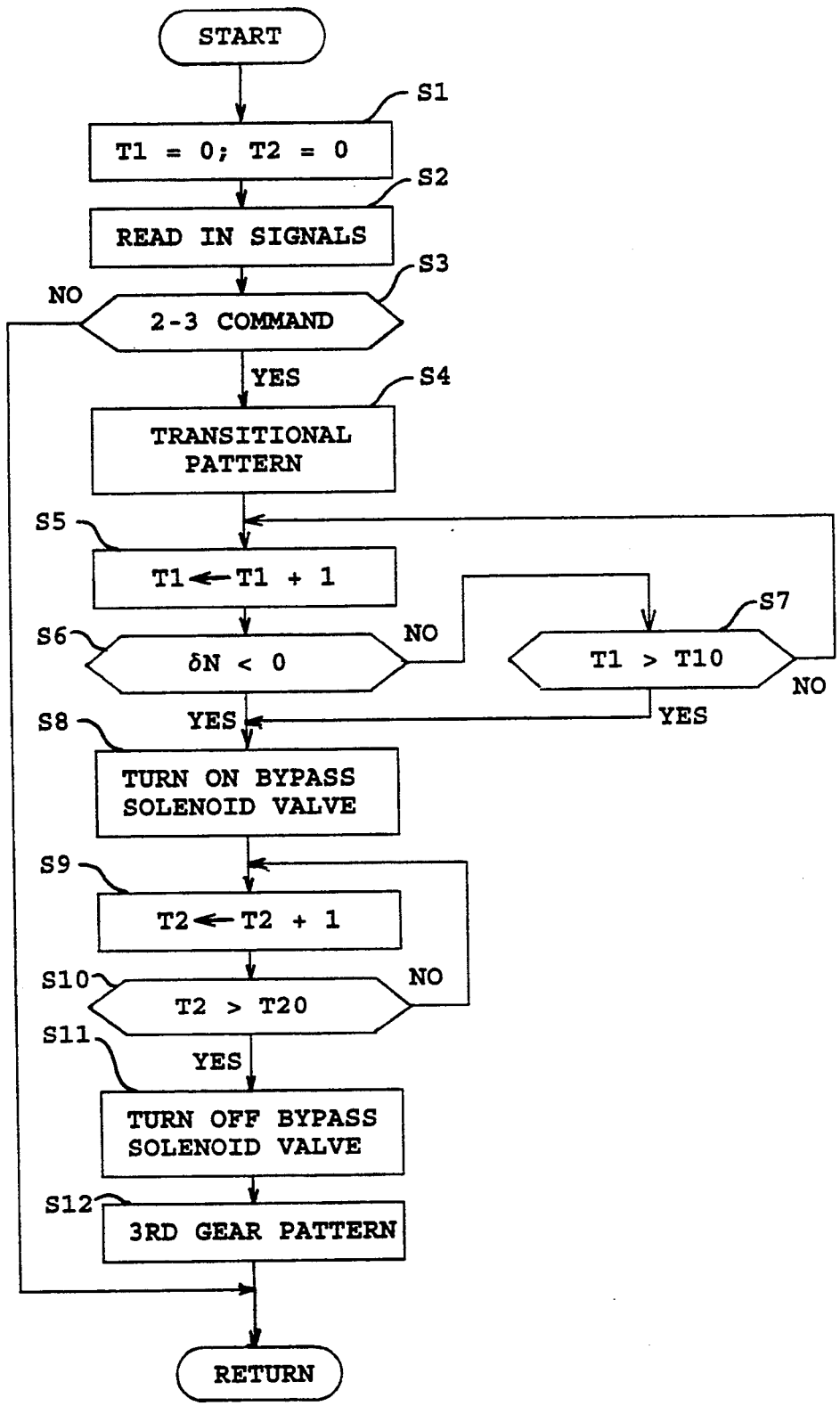
FIG. 6 is a flow chart illustrating a 2-3 shift control sequence.
Figure 7:
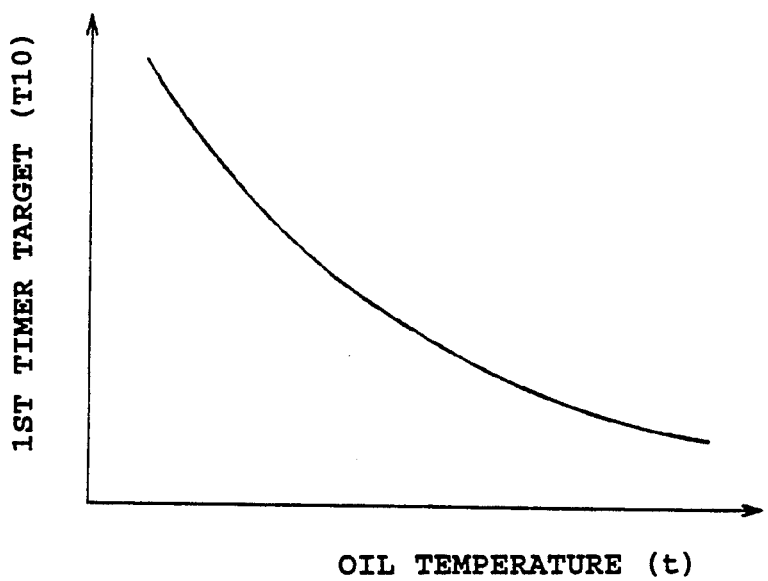
FIG. 7 is a diagram showing a map of first timer target.
Figure 8:
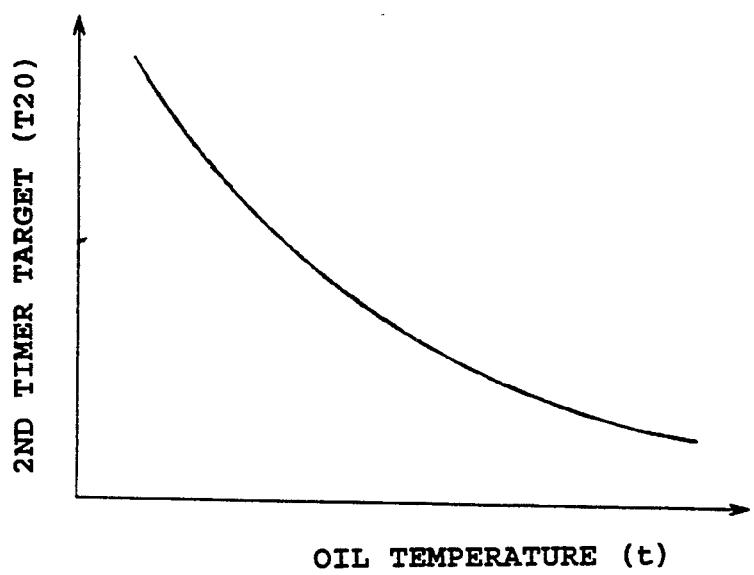
FIG. 8 is a diagram showing a map of first timer target.
Figure 9:
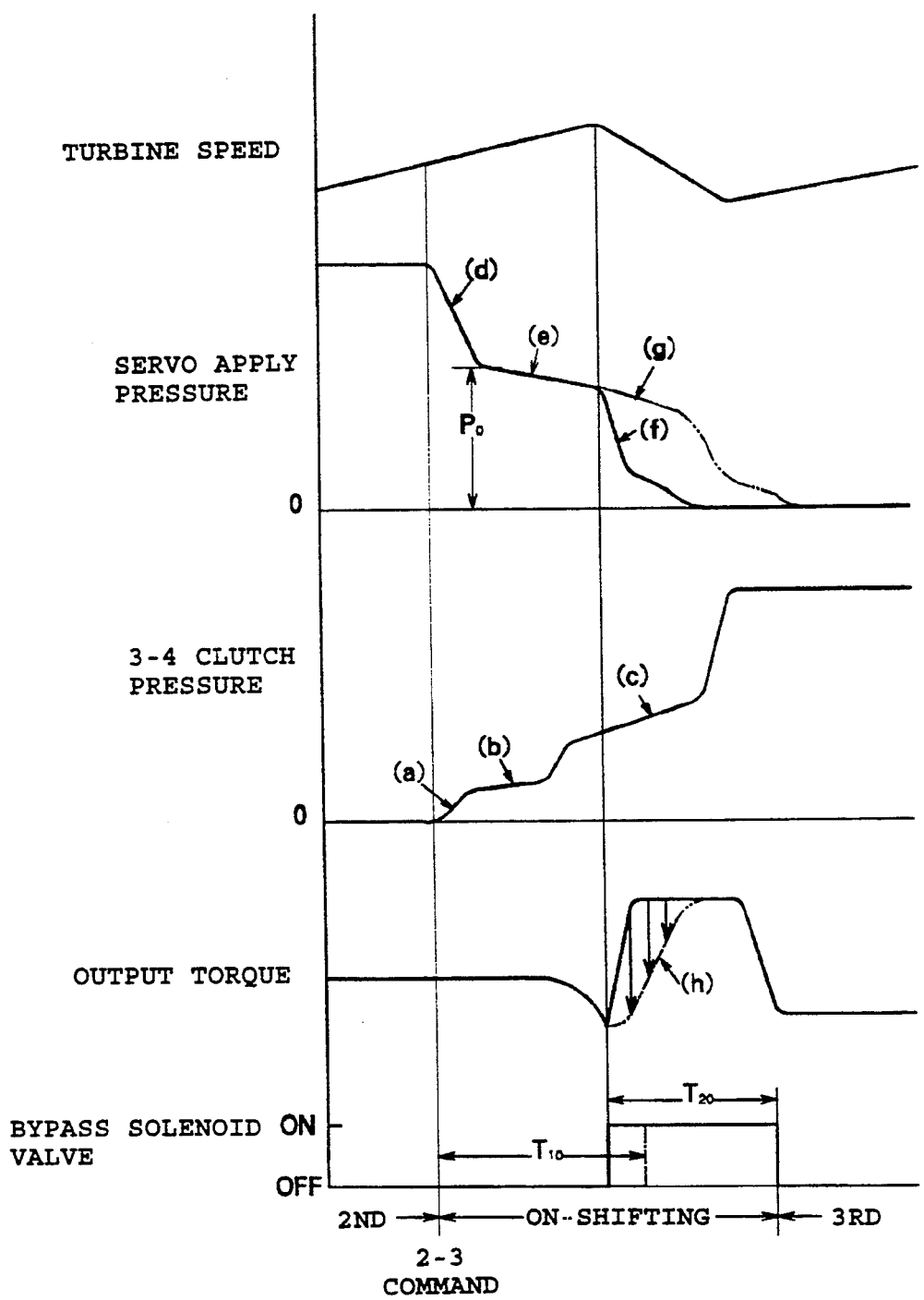
FIG. 9 is a time chart illustrating operations of the shift control system.

The operation of the shift control system depicted in FIGS. 1 and 2 is best understood by reviewing FIG. 6, which is a flow chart illustrating a gear shift control routine, in conjunction with FIGS. 7 to 9. The following description is directed especially to, for instance, a second-to-third (2-3).

When the sequence commences, then, control passes directly to step S1 where first and second time counts T1 and T2 are cleared. Then, based on signals from the respective sensors 151-155 read in step S2, a decision is made in step S3 as to whether there is a 2-3 shift-up demand. If the answer to the decision is "NO," this indicates that the current drive condition is inadequate for conducting a 2-3 shift-up, then, the sequence returns. On the other hand, If the answer to the decision is "YES," this indicates that the current driving condition is such that a 2-3 shift-up must be conducted, then, the first to third solenoid valves 66 to 68 are switched in ON-OFF pattern from the 2nd gear pattern (ON, ON, ON) to the transitional pattern (OFF, ON, ON) in step S4. Subsequently, after changing the timer count T1 by one increment in step S5, a decision is made in step S6 whether the ratio of change ($\delta N$) in rotational speed of turbine 23 is less than zero (0). If the answer to the decision is "NO," this indicate that the turbine 23 is accelerating, then, a decision is made in step S7 as to whether the first timer count T1 is beyond a first target timer count T10. This first target timer count T10, which is established larger with an increase in oil temperature (t), is read out from a first target timer count map, shown in FIG. 7, according to the temperature of oil. These steps S5, S6 and S7, are repeated until the ratio of change ($\delta N$) in rotational speed of turbine 23 becomes negative, that is, the turbine 23 becomes decelerated or the first timer count 1 has become larger than the first target timer count T10. When the turbine 23 is decelerating or when the first timer count T1 has exceeded the first target timer count T10 even though the turbine 23 is accelerating, then, in step S8, a signal is provided so as to turn on the bypass control solenoid valve 96.

Subsequently, after changing the timer count T2 by one increment in step S9, a decision is made in step S10 as to whether the second timer count T2 is beyond a second target timer count T20. This second target timer count T10, which is established larger with an increase in oil temperature (t), is read out from a second target timer count map, shown in FIG. 8, according to the temperature of oil. These steps S9 and S10 are repeated until the second timer count T2 has become larger than the second target timer count T20. When the answer to the decision made in step S10 is "YES," then in step S11, a signal is provided so as to turn off the bypass control solenoid valve 96. Thereafter, the first to third solenoid valves 66 to 68 are switched in ON-OFF pattern from the transitional pattern (OFF, ON, ON) to the 3rd gear pattern (On, OFF, OFF) in step S12.

Referring to FIG. 9, which is a time chart of operation of the automatic transmission controlled by the shift control system according to the preferred embodiment of the present invention, when a 2-3 shift command is provided, solenoid control signals (ON/OFF signals) are provided so as to switch the first to third solenoid valves 66 to 68 to OFF, OFF and ON states. As a result, the 1-2, 2-3 and 3-4 shift valves 63, 64 and 65 are forced to place their spools 63b, 64b and 65b in their left, left and right end positions, respectively, so that the second output pressure line 112, into which the line pressure is delivered from the maine pressure line 110, is brought into communication with the 3-4 clutch pressure line 124 via the 2-3 shift valve 64. Accordingly, the line pressure is supplied into the 3-4 clutch 43 from the second output pressure line 112 via the 3-4 clutch pressure line 124, so as to commence locking of 3-4 clutch 43. On the other hand, the servo-pressure apply line 121, leading to the servo-piston 45a at the apply port 45b, is brought into communication with the 1-2 shift valve 63 at the drain port 63c, so as to discharge the servo pressure from the servo piston 45a, thereby commencing unlocking of 2-3 brake 45. In this instance, immediately after the commencement of supply of the line pressure to the 3-4 clutch, the hydraulic pressure discharged toward the 3-4 clutch pressure line 124 from the second output pressure line 112 passes through the bypass pressure line 142 and 2-3 bypass valve 93, and rapidly fills within the pressure passage leading to the 3-4 clutch 43. At this time, the pressure in the 3-4 clutch pressure line 124 downstream from the one-way orifice 78 rises. When the thrust force applied against one end of the spool 93a of the 2-3 shift valve 93, which is feedback controlled, exceeds the thrust force applied against another end of the spool 93a by the spring, the spool 93 is shifted to its left end position, so as to disconnect the bypass pressure line 142. Thereafter, the supply of pressure becomes gentle by means of throttling action of one-way orifice 78. In other words, the 3-4 clutch pressure rises rapidly immediately after the commencement of pressure supply as indicated by a character a and, after a while, the rise of 3-4 clutch pressure, however, becomes relatively gentle as indicated by a character b. Thereafter, under the operation of accumulator 79, after keeping a predetermined rate of change as indicated by a character c, it finally reaches a pressure corresponding to the line pressure. While the pressure is rising at the predetermined rate of change, the 3-4 clutch 43 is completely locked via what is called "clutch-slipping" where a predetermined amount of slippage is allowed.

On the other hand, immediately after the commencement of unlocking of 2-4 brake, the servo-pressure apply line 121 is brought into communication with the 1-2 shift valve 63 at the drain port 63c, so that the pressure in the servo-pressure apply line 121 becomes higher downstream from the pressure discharge control valve 74 than upstream from the pressure discharge control valve 74. Consequently, the pressure discharge control valve 74 forces its valve body 74b downward against the coil spring 74c, so as to bring the downstream port 74a of servo-apply pressure line 121 into communication with the relief port 74d of servo-apply pressure line 121. As a result, the major portion of pressurized oil downstream from the pressure discharge control valve 74 is discharged relatively rapidly through the one-way orifice 73 having a relatively large diameter. In other words, the servo-apply pressure in the servo-piston 45a at the apply port 45c is discharged relatively rapidly as indicated by a character d.

When the servo-apply pressure drops to the specified pressure Po established by the coil spring 74c, the valve body 74b is forced upward to its initial position, so as to disconnect the communication between the downstream port 74a and relief port 74d of servo-apply pressure line 121. Consequently, the discharge of servo-apply pressure becomes gentle by means of throttling action of the orifice 74e of the valve body 74b. In this instance, since the return movement of valve body 74b to the initial position is caused by the coil spring 74c only, after the servo-apply pressure has reached the specified pressure Po, it drops at a predetermined rate of change as indicated by a character e. As a result, 2-4 brake 45 is completely unlocked via clutch-slipping. Accordingly, unlocking of 2-4 brake 45 certainly overlaps locking of 3-4 clutch 43, so as to eliminate a neutral state of transmission gear mechanism 30. This results in preventing an occurrence of a racing of the engine.

Figure 10:
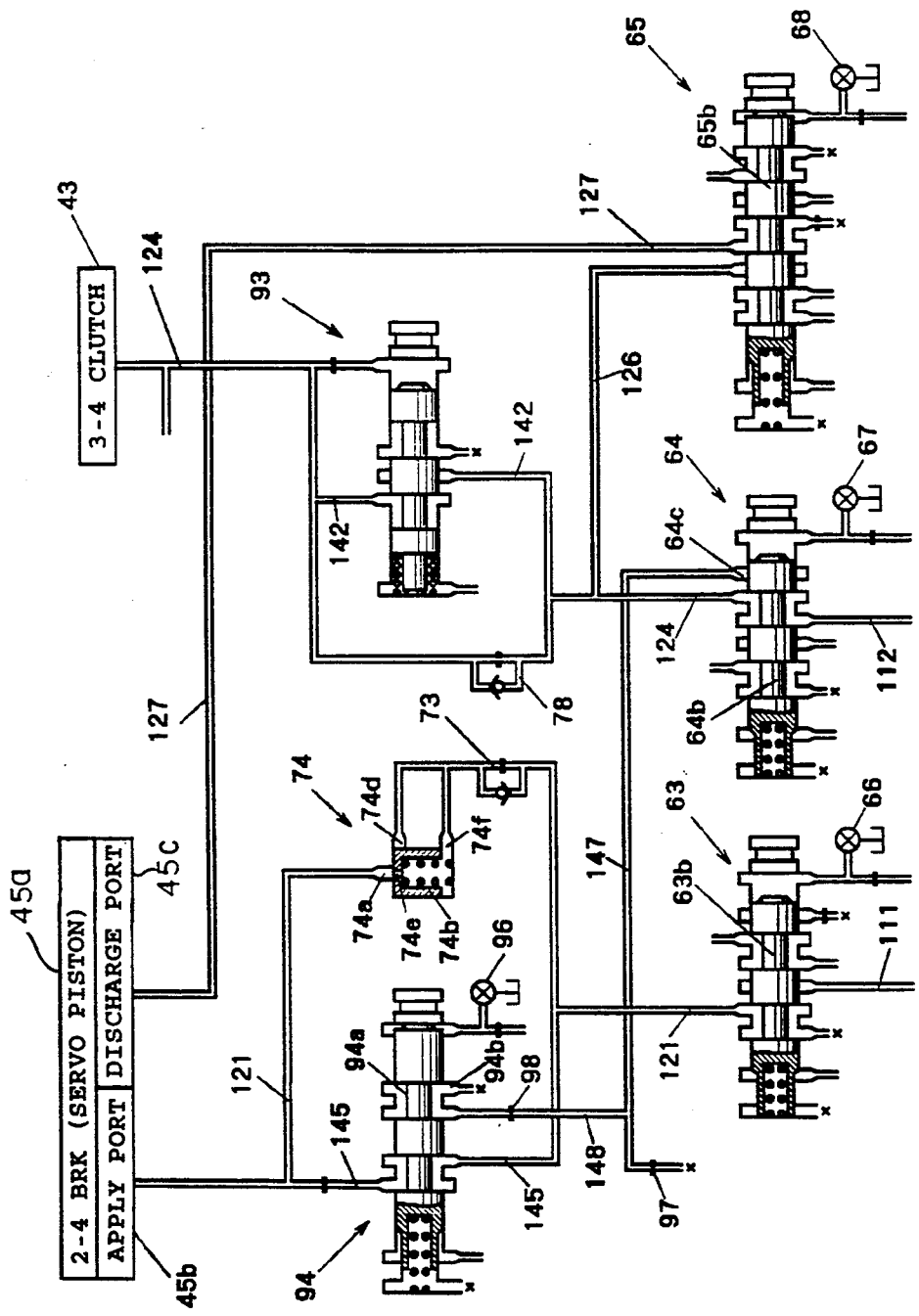
FIG. 10 is an enlarged diagram showing the essential part of the hydraulic circuit in a state during a 2-3 up-shifting.

With the advancement of the shift operation of automatic transmission 10, at the time the turbine 23 becomes decelerated and then, the shift operation transits into a second half period of shift operation, which is called an "inertia phase," the control unit 200 provides a signal so as to turn on the bypass control solenoid valve 96. As a result, as shown in FIG. 10, the timing valve 94 shifts its spool 94a to its right end position, so as to open the bypass pressure line 145. Consequently, the servo-apply pressure is rapidly discharged as indicated by a character f in FIG. 9, so as to completely unlock the 2-4 brake 45. This eliminates an excessive overlap between locking of 3-4 clutch 43 and unlocking 2-4 brake 45 and effectively prevents a shift shock due to a drop of output torque of transmission gear mechanism 30, accordingly. In other words, if the timing valve 94 is not installed and hence, even during the inertia phase of shift operation, the servo-apply pressure drops at the predetermined rate of change by means of the throttling function of pressure discharge control valve 74 as indicated by a character g in FIG. 9, the output torque from the transmission gear mechanism 30 drops as indicated by a character h subsequently to a torque drop in a first half period of shift operation. Such a torque drop gives the driver a feeling of discomfort as an excessive shift shock. However, with the configuration of automatic transmission 10 controlled by the shift control system in accordance with a preferred embodiment of the present invention, because the timing valve 94 is actuated in the second half period of shift operation to open the bypass pressure line 145, which bypasses the pressure discharge control valve 74, and hence the one-way orifice 73, the servo-apply pressure is rapidly discharged, so that there causes no shift shock.

Furthermore, even if it is not executed to detect the speed of turbine 23 due, for example, to a malfunction of turbine speed sensor 204, the bypass control solenoid valve 96 is actuated to open the bypass pressure line 145 when the first target timer count T10 is counted, so as to prevent the state of double-locking during a 2–3 shift-up. In this instance, the first target timer count T10 is desired to be established such that it is relatively longer than a time from the demand of 2–3 shift to when the shift operation transfers into an inertia phase.

Figure 11:
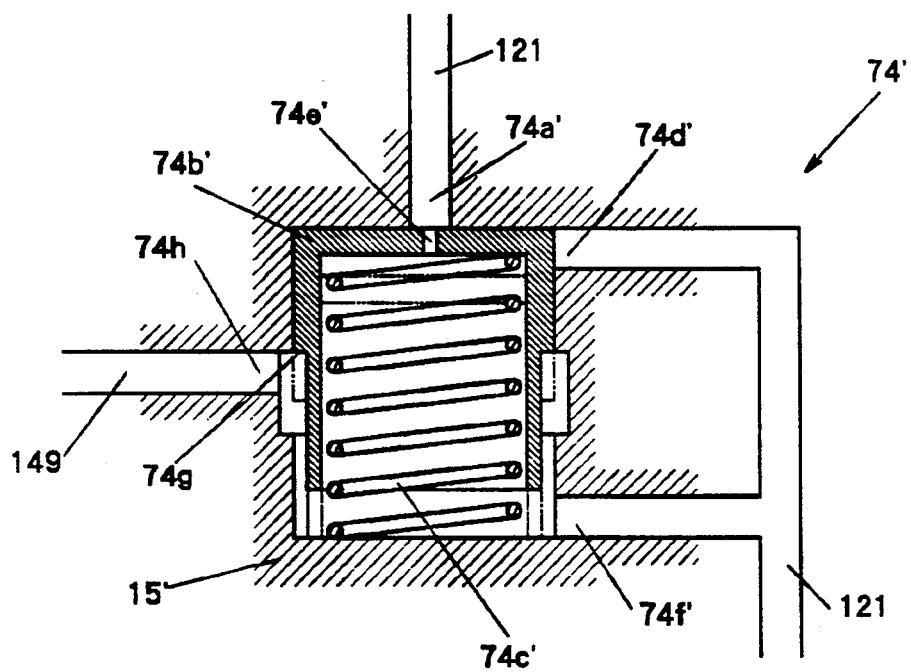
FIG. 11 is an enlarged cross-sectional view of a pressure discharge control valve used in the hydraulic circuit of a shift control system in accordance with another preferred embodiment of the present invention.

The pressure discharge control valve 74 may be changed as shown in FIG. 11.

Referring to FIG. 11, a pressure discharge control valve 74' has a hollow cylindrical housing 15' in which a hollow cylindrical valve body 74b' having a closed bottom end is fitted upside down so as to slide up and down. This valve body 74b' is urged upward by means of a coil spring 74c'. The interior of housing 15 is in communication with an downstream port 74a' of servo-apply pressure line 121, an upstream port 74f' and a relief port 74d'. This downstream port 74a' of servo-apply pressure line 121 is kept communicated with the interior of the hollow valve body 74b' by means of a relatively large orifice 74e' formed in the bottom end of valve body 74b'. Further, the lower half portion of valve body 74' is formed smaller in outer diameter than the upper half portion so as to provide an annular shoulder 74g. Corresponding in position to the shoulder of valve body 74' the cylindrical housing 15' is formed with a middle port 74h to which a pressure line 149, branching off from the pressure line 139, so as to introduce throttle modulated pressure generated by the pressure modulator valve 92 to the pressure discharge control valve 74'.

Figure 12:
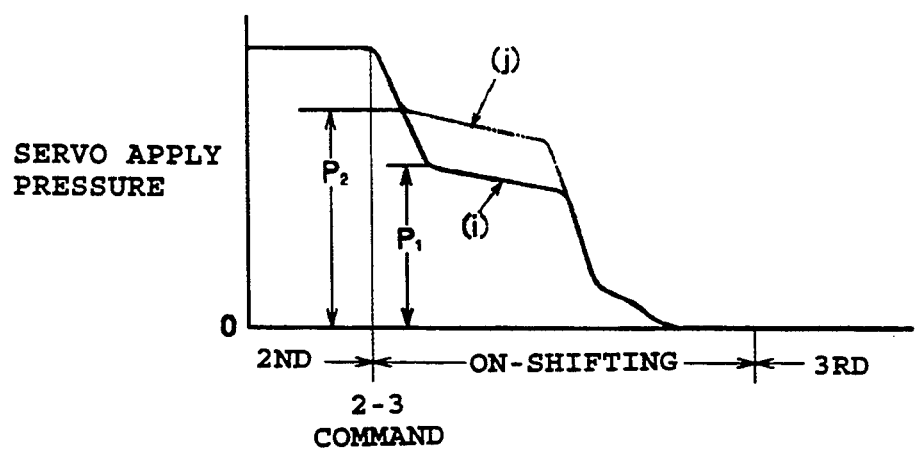
FIG. 12 is a time chart illustrating operations of the other shift control system.

With a shift control system for an automatic transmission in which the modified pressure discharge control valve 74', at the beginning of releasing of servo-supply pressure, the valve body 74b' is forced down against the coil spring 74c', the downstream port 74a' and relief port 74d' of servo-apply pressure line 121 are brought into direct communication, so that the pressure discharge control valve 74' discharges hydraulic pressure in the apply port 45b of servo piston 45a quickly. When the servo-apply pressure drops down to a predetermined level of pressure which depends upon the reaction force of coil spring 74c', the valve body 74b' is forced back upward, so as to disconnect the downstream port 74a' of servo-apply pressure line 121 from the discharge port 74d' of servo-apply pressure line 121 and connect it to the upstream port 74f' of servo-apply pressure line 121. Then, by means of the throttling action of orifice 74e', the pressure discharge control valve 74' discharges hydraulic pressure in the apply port 45b' of servo piston 45a' gently into the upstream port 74f' of servo-apply pressure line 121. In this instance, since throttle modulated pressure is introduced into the pressure control valve 74' at the middle port 74h through the pressure line 149 via the pressure line 139, the pressure to close the pressure control valve 74' changes according to the opening of throttle, i.e. the load of engine. In other words, during a 2–3 shift-up, while the engine load is low, the servo-apply pressure changes to a relatively lower level as indicated by a character $i$ in FIG. 12 when it has dropped to a specified pressure P1 determined according to the coil spring 74c' and throttle modulated pressure. On the other hand, while the engine load is high, since throttle modulated pressure rises, the servo-apply pressure changes to a relatively higher level as indicated by a character $j$ in FIG. 12 when it has dropped to a specified pressure P2, which is increased higher than the specific pressure P1 with an increase in throttle modulated pressure.

It is to be understood that although the present invention has been described in detail with respect to a specific embodiment thereof, various other embodiments and variants, which fall within the scope and spirit of the invention, may occur to those skilled in the art. Such other embodiments and variants are intended to be covered by the following claims.

What is claimed is:

1. In a shift control system for an automatic transmission having a plurality of hydraulically operated frictional elements for an automotive vehicle for selectively locking and unlocking said hydraulically operated frictional elements so as to automatically perform gear shifts according to vehicle driving conditions, a specific one of said gear shifts being executed by unlocking a first specific hydraulically operated frictional element of said hydraulically operated frictional elements simultaneously with locking a second specific hydraulically operated frictional element of said hydraulically operated frictional elements, the improvement comprising:

a hydraulic control circuit for supplying and releasing pressurized hydraulic oil for locking and unlocking to said hydraulically operated frictional elements, said hydraulic control circuit including pressure control means for allowing said locking oil pressure to be discharged from said first specific hydraulically operated frictional element without being throttled until said locking oil pressure drops to a specified level of pressure and throttling said locking oil pressure discharged from said first specific hydraulically operated frictional element after said locking pressure has dropped below said specified level of pressure.

2. In a shift control system as defined in claim 1, wherein said hydraulic control circuit further includes bypass passage means for allowing said locking oil pressure to bypass said pressure control means, and switching means for closing said bypass passage means for a first half period of said specific gear shift and opening said bypass passage means for a second half period of said specific gear shift.

3. In a shift control system as defined in claim 2, wherein said switching means is actuated to open said bypass passage means after a specified time from a commencement of said specific gear shift.

4. In a shift control system as defined in claim 3, wherein said specified time is changed shorter with an increase in the temperature of said hydraulic oil.

5. In a shift control system as defined in claim 1, wherein said shift control system actuates said switching means to open said bypass passage means when a changing rate of said rotational speed has become minus.

6. In a shift control system as defined in claim 1, wherein said specified level of pressure is increased according to a rise in engine load.

7. In a shift control system as defined in claim 1, wherein said pressure control means is self-responsive to said locking oil pressure discharged from said first specific hydraulically operated frictional element.

8. In a method of controlling gear shifts for an automatic transmission having a plurality of hydraulically operated frictional elements for an automotive vehicle in which said hydraulically operated frictional elements are selectively locked and unlocked so as to automatically perform gear shifts according to vehicle driving conditions, a specific one of said gear shifts being executed by unlocking a first specific hydraulically operated frictional element of said hydraulically operated frictional elements simultaneously with locking a second specific hydraulically operated frictional element of said hydraulically operated frictional elements, the improvement comprising:

discharging locking oil pressure from said first specific hydraulically operated frictional element through an oil pressure control valve without throttling it until said locking oil pressure drops to a specified level of pressure, and with throttling it after said locking pressure has dropped below said specified level of pressure.

9. In a shift control system as defined in claim 8, further comprising causing said locking oil pressure to bypass said oil pressure control valve for a second half period of said specific gear shift.

10. In a shift control system as defined in claim 9, further causing said locking oil pressure to bypass said oil pressure control valve after a specified time from a commencement of said specific gear shift.

11. In a shift control system as defined in claim 9, further changing said specified time to be shorter with an increase in the temperature of said hydraulic oil.

12. In a shift control system as defined in claim 8, further causing said locking oil pressure to bypass said oil pressure control valve when a changing rate of said rotational speed has become minus.

13. In a shift control system as defined in claim 8, further increasing said specified level of pressure according to a rise in engine load.

* * * * *